(12) United States Patent
Nakamaru et al.

(10) Patent No.: US 9,040,166 B2
(45) Date of Patent: May 26, 2015

(54) HOT-PRESSED MEMBER

(75) Inventors: Hiroki Nakamaru, Fukuyama (JP); Seiji Nakajima, Chiba (JP); Tatsuya Miyoshi, Fukuyama (JP); Hiroyuki Masuoka, Fukuyama (JP); Shinji Ootsuka, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 13/504,755

(22) PCT Filed: Oct. 28, 2010

(86) PCT No.: PCT/JP2010/069643
§ 371 (c)(1),
(2), (4) Date: Aug. 9, 2012

(87) PCT Pub. No.: WO2011/052797
PCT Pub. Date: May 5, 2011

(65) Prior Publication Data
US 2012/0321903 A1     Dec. 20, 2012

(30) Foreign Application Priority Data

Oct. 28, 2009 (JP) ................. 2009-247384
Apr. 28, 2010 (JP) ................. 2010-102849
Sep. 29, 2010 (JP) ................. 2010-218094

(51) Int. Cl.
*B32B 15/04*     (2006.01)
*B32B 15/18*     (2006.01)
(Continued)

(52) U.S. Cl.
CPC ................ *C21D 8/0247* (2013.01); *C23C 2/28* (2013.01); *Y10T 428/12611* (2015.01);
(Continued)

(58) Field of Classification Search
CPC .... B32B 15/013; B32B 15/015; C22C 18/00; C22C 38/02; C22C 38/04; C22C 38/06; C22C 38/18; C22C 38/32; C22C 38/60; C23C 10/28; C23C 2/26; C23C 2/28; C23C 10/60; C23C 26/00; C23C 28/321; C23C 28/322; C23C 28/325; C23C 28/345; Y10T 428/12611; Y10T 428/12618; Y10T 428/1266; Y10T 428/12799; Y10T 428/12944; Y10T 428/12972; Y10T 428/12979; Y10T 428/265
USPC ......... 428/632, 610, 614, 628, 629, 633, 658, 428/659, 679, 680, 684, 685, 336, 335, 332, 428/689, 450, 472
See application file for complete search history.

(56) References Cited

U.S. PATENT DOCUMENTS 4,969,980 A * 11/1990 Yoshioka et al. ............. 205/130
5,582,658 A * 12/1996 Masui et al. .................. 148/518
(Continued)

FOREIGN PATENT DOCUMENTS

GB     1490535        11/1977
JP     S 57-171692 A  10/1982
(Continued)

OTHER PUBLICATIONS

Machine Translation, Morita et al., JP 10-072036, Mar. 1998.*
(Continued)

*Primary Examiner* — Michael E La Villa
(74) *Attorney, Agent, or Firm* — RatnerPrestia

(57) ABSTRACT

A hot-pressed member includes a steel sheet, a Ni-diffusion region present in a surface layer of the steel sheet, and an intermetallic compound layer and a ZnO layer which are provided in order on the Ni-diffusion region, the intermetallic compound layer corresponding to a γ phase present in a phase equilibrium diagram of a Zn—Ni alloy, wherein a spontaneous immersion potential indicated in a 0.5 M NaCl aqueous air-saturated solution at 25° C.±5° C. is −600 to −360 mV based on a standard hydrogen electrode.

7 Claims, 2 Drawing Sheets

(51) Int. Cl.

| | | |
|---|---|---|
| *C21D 8/02* | (2006.01) | |
| *C23C 2/28* | (2006.01) | |
| B32B 15/01 | (2006.01) | |
| *C22C 18/00* | (2006.01) | |
| *C22C 38/02* | (2006.01) | |
| *C22C 38/04* | (2006.01) | |
| *C22C 38/06* | (2006.01) | |
| *C22C 38/18* | (2006.01) | |
| *C22C 38/32* | (2006.01) | |
| *C22C 38/60* | (2006.01) | |
| *C23C 10/28* | (2006.01) | |
| *C25D 5/48* | (2006.01) | |
| *C25D 5/50* | (2006.01) | |
| *C21D 1/673* | (2006.01) | |
| *C23C 2/26* | (2006.01) | |
| *C23C 10/60* | (2006.01) | |
| *C23C 26/00* | (2006.01) | |
| *C23C 28/00* | (2006.01) | |
| *B21D 31/00* | (2006.01) | |
| *C25D 3/56* | (2006.01) | |
| *C21D 8/04* | (2006.01) | |

(52) U.S. Cl.
CPC ...... *Y10T 428/12618* (2015.01); *Y10T 428/1266* (2015.01); *Y10T 428/12799* (2015.01); *Y10T 428/12944* (2015.01); *Y10T 428/12972* (2015.01); *Y10T 428/12979* (2015.01); *Y10T 428/265* (2015.01); *B32B 15/013* (2013.01); *B32B 15/015* (2013.01); *C22C 18/00* (2013.01); *C22C 38/02* (2013.01); *C22C 38/04* (2013.01); *C22C 38/06* (2013.01); *C22C 38/18* (2013.01); *C22C 38/32* (2013.01); *C22C 38/60* (2013.01); *C23C 10/28* (2013.01); *C25D 5/48* (2013.01); *C25D 3/565* (2013.01); *C25D 5/50* (2013.01); *C21D 8/0457* (2013.01); *C21D 1/673* (2013.01); *C23C 2/26* (2013.01); *C23C 10/60* (2013.01); *C23C 26/00* (2013.01); *C21D 2251/02* (2013.01); *C23C 28/321* (2013.01); *C23C 28/322* (2013.01); *C23C 28/325* (2013.01); *C23C 28/345* (2013.01)
USPC ........... 428/632; 428/614; 428/629; 428/633; 428/659; 428/679; 428/680; 428/684; 428/336; 428/472; 428/450

(56) References Cited

U.S. PATENT DOCUMENTS

| | | |
|---|---|---|
| 2001/0042393 A1 | 11/2001 | Kefferstein et al. |
| 2006/0121305 A1 | 6/2006 | Yoshikawa et al. |
| 2007/0163685 A1 | 7/2007 | Kusumi et al. |
| 2009/0238715 A1 | 9/2009 | Cho et al. |
| 2014/0216610 A1 | 8/2014 | Nakamaru et al. |

FOREIGN PATENT DOCUMENTS

| | | |
|---|---|---|
| JP | S 57-210991 A | 12/1982 |
| JP | 61-227181 A | 10/1986 |
| JP | 03-104855 A | 5/1991 |
| JP | 10-072036 * | 3/1998 |
| JP | 10-072036 A | 3/1998 |
| JP | 2000-038640 A | 2/2000 |
| JP | 2000-328257 A | 11/2000 |
| JP | 2001-353548 | 12/2001 |
| JP | 2002-018531 A | 1/2002 |
| JP | 2002-102980 A | 4/2002 |
| JP | 2002-282951 A | 10/2002 |
| JP | 2004-124207 A | 4/2004 |
| JP | 3582504 B2 | 10/2004 |
| JP | 2004-315836 A | 11/2004 |
| JP | 2004-323951 A | 11/2004 |
| JP | 2005-139485 A | 6/2005 |
| JP | 2005-290395 A | 10/2005 |
| JP | 2006-051543 A | 2/2006 |
| JP | 2006-110713 A | 4/2006 |
| JP | 2007-056307 | 3/2007 |
| JP | 2007-063578 A | 3/2007 |
| JP | 2007-291508 A | 11/2007 |
| JP | 2009-142853 A | 7/2009 |
| JP | 2009-142854 A | 7/2009 |
| JP | 2010-090462 A | 4/2010 |
| JP | 2010-090463 A | 4/2010 |
| JP | 2010-090464 A | 4/2010 |
| JP | 4849186 | 10/2011 |

OTHER PUBLICATIONS

Machine Translation, Imai et al. JP 3582504 B, Oct. 2004.*
Examination Results of a Surace Coating Film After Hot-Pressing of a Steel Plate Electroplated with a Zn-Ni Alloy, no date.*
International Search Report dated Jan. 18, 2011, application No. PCT/JP2010/069643.
Supplemental European Search Report dated Nov. 13, 2013, application No. EP 10 82 6927.
Research Report Regarding Surface Film Condition of an Electroplated Steel Sheet After Hot-Press [Research Report provided wtih the Request for Invalidty dated Dec. 12, 2013 to verify the content of Reference 1].
The Physical Metallurgy of Steels by William C. Leslie, Translated into Japances by Kou Kumai et al., pp. 272-273.
Factors Controlling the Paint Adhesion of Zinc Alloy Electroplated Steel Sheet: Iron and Steel vol. 72 (1986) No. 1, pp. 101-106.
Phosphatability of Zn-Ni Alloy Electroplated Steel Sheets: Iron and Steel vol. 77 (1991) No. 7, pp. 200-207.
Effects of Ni Content in Zn-Ni Alloys on Phosphatability and Press Formability of Automotive Exposed Panels, Kawasaki Steel GIHO vol. 23 (1991) No. 4, pp. 321-326.
Effects of MnS on Toughness of Refining Steel: Iron and Steel vol. 65 (1979) No. 11, p. 354.
JIS Handbook 1986, p. 24.
Request for Invalidity, Dec. 12, 2013.
Outline of Written Reply, submitted in prosecution of JP 4849186, dated Mar. 6, 2014.
Outline of Request for Correction, submitted in prosecution of JP 4849186, dated Mar. 6, 2014.
English Translation of Research Report Regarding Surface Film Condition of an Electroplated Steel Sheet After Hot-Press.

* cited by examiner

HOT-PRESSED MEMBER

CROSS REFERENCE TO RELATED APPLICATIONS

This application is the U.S. National Phase application of PCT International Application No. PCT/JP2010/069643, filed Oct. 28, 2010, and claims priority to Japanese Patent Application Nos. 2009-247384, filed Oct. 28, 2009, 2010-102849, filed Apr. 28, 2010 and 2010-218094, filed Sep. 29, 2010, disclosure of which are incorporated herein by reference in their entireties for all purposes.

FIELD OF THE INVENTION

The present invention relates to a hot-pressed member produced by pressing a heated steel sheet, and particularly to a hot-pressed member used for underbody parts and car body structures of automobiles and a method for producing the same.

BACKGROUND OF THE INVENTION

Many underbody parts and body structural members of automobiles have been produced by pressing steel sheets having predetermined strength. From the viewpoint of global environment conservation, weight lightening of automobile car bodies has recently been desired eagerly, and the effort to decrease the thickness of the steel sheet used by strengthening the steel sheet has been continued. However, the pressing workability decreases with strengthening of steel sheets, and thus it is often difficult to process steel sheets into desired member shapes.

Therefore, Patent Literature 1 proposes a processing technique referred to as "hot-pressing" which enables both easy working and strengthening by quenching and processing a heated steel sheet at the same time using a mold including a die and a punch. However, in the hot-pressing, the steel sheet is heated to a high temperature of about 950° C. before the hot-pressing, and thus scales (Fe oxides) are produced on a surface of the steel sheet and are separated during the hot-pressing, thereby causing the problem of damaging the mold or damaging a surface of a member after the hot-pressing. In addition, the scales remaining on a surface of the member causes a poor appearance, a decrease in coating adhesion, or a decrease in corrosion resistance after coating. Therefore, the scales on a surface of the member are generally removed by a treatment such as pickling or shot blasting, but this complicates the production process and decreases productivity.

From this viewpoint, there has been demand for a hot-pressing technique capable of suppressing the formation of scales during heating before hot-pressing and improving coating adhesion and corrosion resistance after coating of a member after the hot-pressing, and a steel sheet having a film such as a coating layer provided on a surface thereof, and a hot-pressing method using the steel sheet have been proposed.

For example, Patent Literature 2 discloses a coated steel sheet coated with Al or an Al alloy. It is described that by using the coated steel sheet, decarburization and oxidation are prevented during heating before hot-pressing, and a hot-pressed member having very high strength and excellent corrosion resistance can be produced.

In addition, Patent Literature 3 discloses a hot-pressing method in which when a steel sheet coated with Zn or a Zn-based alloy is hot-pressed, an alloy compound such as a Zn—Fe-based compound or Zn—Fe—Al-based compound, which prevents corrosion and decarburization and has a lubricating function, is produced on a surface of the steel sheet during heating before hot-pressing. It is also described that with a hot-pressed member produced by the method, particularly a hot-pressed member including a steel sheet coated with Zn-50 to 55 mass % Al, the excellent corrosion preventing effect can be achieved.

Further, Patent Literature 4 discloses a hot-pressing method including heating a steel sheet provided with a coating, which mainly contains Al or Zn, in an atmosphere having a hydrogen concentration of 6% by volume or less and a dew point of 10° C. or less at a heating temperature of an $Ac_3$ transformation point or more and 1100° C. or less, and then hot-pressing the steel sheet, thereby achieving excellent hydrogen embrittlement resistance. In this hot-pressing method, the amounts of hydrogen and water vapor in the atmosphere during heating are decreased to decrease the amount of hydrogen entering the steel, thereby attempting to avoid hydrogen embrittlement associated with an increase in strength to over 1000 MPa.

PATENT LITERATURE

[PTL 1] British Patent Publication No. 1490535
[PTL 2] Japanese Patent Publication No. 3931251
[PTL 3] Japanese Patent Publication No. 3663146
[PTL 4] Japanese Unexamined Patent Application Publication No. 2006-51543

SUMMARY OF THE INVENTION

However, the hot-pressed members described in Patent Literatures 2 to 4 have the problem of hydrogen embrittlement due to the hydrogen entry into steel with corrosion in the use environment rather than the hydrogen entry into steel during heating before hot-pressing.

Aspects of the present invention provide a hot-pressed member which can be produced without production of scales, which has excellent coating adhesion and corrosion resistance after coating, and which can be suppressed from suffering hydrogen entry into steel associated with corrosion, and also provide a method for producing the same.

As a result of intensive study about the above-described intended hot-pressed member, the inventors of the present invention obtained the following findings.

i) Hydrogen entry into steel associated with corrosion is suppressed by the presence of a Ni-diffusion region in a surface layer of a steel sheet which constitutes a member.

ii) Excellent corrosion resistance after coating can be achieved by providing, on the Ni-diffusion region, an intermetallic compound layer corresponding to a γ phase present in a phase equilibrium diagram of a Zn—Ni alloy.

iii) Excellent coating adhesion can be achieved by providing a ZnO layer on the intermetallic compound layer.

Aspects of the present invention have been achieved based on these findings and provides a hot-pressed member characterized in that a Ni-diffusion region is present in a surface layer of a steel sheet constituting the member, an intermetallic compound layer corresponding to a γ phase present in a phase equilibrium diagram of a Zn—Ni alloy and a ZnO layer are provided in order on the Ni-diffusion region, and a spontaneous immersion potential indicated in a 0.5 M NaCl aqueous air-saturated solution at 25° C.±5° C. is −600 to −360 mV based on a standard hydrogen electrode.

In accordance with aspects of the present invention, in the hot-pressed member, preferably, the Ni-diffusion region is present over a range of 1 µm or more in the depth direction of the steel sheet, the intermetallic compound layer is present in an island-like form, and at least one compound layer selected from a Si-containing compound layer, a Ti-containing compound layer, an Al-containing compound layer, and a Zr-containing compound layer is provided directly below the ZnO layer.

In accordance with aspects of the present invention, the hot-pressed member can be produced by heating a Ni-based coated steel sheet including a Zn—Ni alloy coating layer, which contains 13% by mass or more of Ni, on a surface thereof in a temperature region of an $Ac_3$ transformation point to 1200° C., or by heating a Ni-based coated steel sheet including a Zn—Ni alloy coating layer, which contains 10% by mass or more and less than 13% by mass of Ni at a coating weight of over 50 g/cm$^2$ per side of the steel sheet, in a temperature region of an $Ac_3$ transformation point to 1200° C. at an average heating rate of 12° C./second or more; and then hot-pressing the steel sheet. The heating in the temperature range of the $Ac_3$ transformation point to 1200° C. is preferably performed at an average heating rate of 85° C./second or more.

In addition, as the Ni-based coated steel sheet, it is preferred to use a Ni-based coated steel sheet further including at least one compound layer selected from a Si-containing compound layer, a Ti-containing compound layer, an Al-containing compound layer, and a Zr-containing compound layer, which is provided on the Zn—Ni alloy coating layer.

As a base steel sheet of the Ni-based coated steel sheet, it is preferred to use a steel sheet having a composition containing, by % by mass, C: 0.15 to 0.5%, Si: 0.05 to 2.0%, Mn: 0.5 to 3%, P: 0.1% or less, S: 0.05% or less, Al: 0.1% or less, N: 0.01% or less, and the balance including Fe and unavoidable impurities, or a steel sheet further containing, by % by mass, at least one selected from Cr: 0.01 to 1%, Ti: 0.2% or less, and B: 0.0005 to 0.08%, and Sb: 0.003 to 0.03% either alone or in combination.

According to aspects of the present invention, it is possible to produce a hot-pressed member without forming scales, which has excellent coating adhesion and corrosion resistance after coating and which can be suppressed from suffering hydrogen entry into steel associated with corrosion. In accordance with aspects of the present invention, the hot-pressed member is preferred as an automobile underbody member and body structural member having a strength of 980 MPa or more.

DETAILED DESCRIPTION

Figure 1:
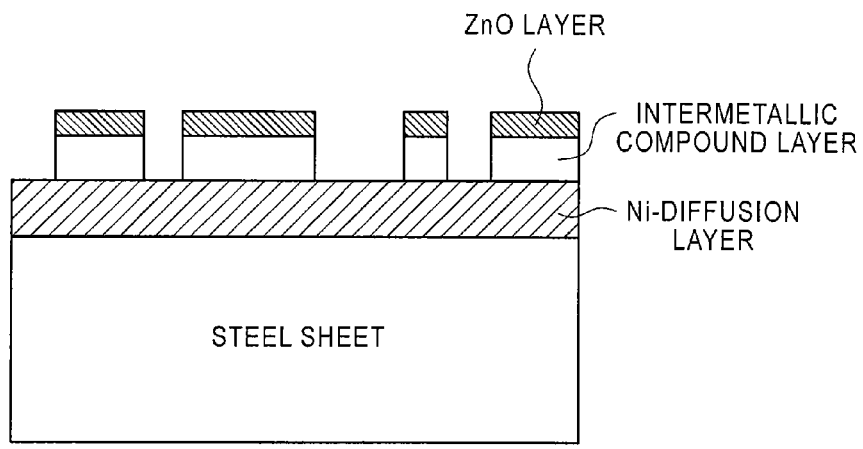
FIG. 1 is a drawing schematically showing a structure of a steel sheet which constitutes a hot-pressed member in a cross-sectional direction along a thickness of the steel sheet.

1) Hot-Pressed Member 1-1) Ni-Diffusion Region of Steel Sheet Constituting Member As described above, the presence of a Ni-diffusion region in a surface layer of a steel sheet constituting a member prevents hydrogen entry into steel associated with corrosion. Although the reason for this is not necessarily known, it is considered as follows: The hydrogen entry into a steel sheet due to corrosion is related to oxidation-reduction reaction of Fe rust in a wet environment, and Fe rust is required to be stable rust which is little converted in order to suppress hydrogen entry. A Ni-diffusion region is effective in stabilizing Fe rust, and hydrogen entry into steel associated with corrosion is suppressed by the presence of the Ni-diffusion region.

However, in order to effectively suppress the hydrogen entry, the Ni-diffusion region is preferably present over a range of 1 μm or more, more preferably 2 μm or more, most preferably 3 μm or more, in the depth direction of the steel sheet constituting the member. Although the upper limit of the depth is not particularly specified, the effect is saturated at a depth of about 50 μm. The depth of the Ni-diffusion region can be determined by analysis of a section in the thickness direction using EPMA (Electron Probe Micro Analyzer) or analysis in a depth direction using GDS (Glow Discharge Spectroscopy).

As used herein, the term "Ni-diffusion region" represents a region where Ni diffuses into steel from a Ni-based coating layer during heating before hot-pressing is present in a solid-solution state. In addition, since a hot-pressed member of embodiments of the present invention is produced by hot-pressing a Ni-based coated steel sheet having a Zn—Ni alloy layer, the Ni-diffusion region may contain Zn as an impurity, but the advantages of the present invention are not impaired.

1-2) Intermetallic Compound Layer Corresponding to γ-Phase Present in a Phase Equilibrium Diagram of Zn—Ni Alloy on the Ni-Diffusion Region An intermetallic compound layer provided on the Ni-diffusion region has a corrosion potential having a sacrificing anticorrosion effect for steel and is thus effective for improving corrosion resistance after coating. The intermetallic compound layer corresponding to a γ-phase present in a phase equilibrium diagram of a Zn—Ni alloy represents a layer composed of an intermetallic compound of any one of $Ni_2Zn_{11}$, $NiZn_3$, and $Ni_5Zn_{21}$. Such an intermetallic compound can be detected by direct X-ray diffraction of a surface of the member or electron beam diffraction while observing, with TEM (Transmission Electron Microscope), a slice prepared from a section in the thickness direction by FIB (Focused Ion Beam) processing.

In order to achieve the above-described effect of the intermetallic compound layer, it is desirable to control the abundance of the intermetallic compound layer as described below.

The abundance of the intermetallic compound layer can be measured by an electrochemical method, i.e., a spontaneous immersion potential in a 0.5 M aqueous NaCl air-saturated solution at 25° C.±5° C. on the basis of a standard hydrogen electrode. When the spontaneous immersion potential becomes more noble than −360 mV with a small mount of the intermetallic compound layer, the sacrificing anticorrosion effect for steel disappears, and the corrosion resistance after coating is degraded. On the other hand, when the spontaneous immersion potential becomes less noble than −600 mV with a large mount of the intermetallic compound layer, the amount of hydrogen generated increases with corrosion, and hydrogen entry may occur even in the presence of the Ni-diffusion region. Therefore, it is desirable to provide the Ni-diffusion region in such an abundance that the spontaneous immersion potential in a 0.5 M aqueous NaCl air-saturated solution at 25° C.±5° C. is −600 to −360 mV based on the standard hydrogen electrode. This abundance is preferably realized by allowing the intermetallic compound layer to be present in an island form. In embodiments of the present invention, the island-like intermetallic compound layer is defined by SEM (Scanning Electron Microscopy) observation of a section as follows:

(1) A specimen of 10 mm×10 mm× thickness is cut out from the member, buried in a resin mold, and polished.

(2) The specimen buried and polished in (1) is used and a reflection electron composition image is photographed with SEM at a magnification of 500 times and an acceleration voltage of 5 to 25 kV.

(3) The specimen is photographed in any desired 10 fields of view.

(4) In a photograph, as schematically illustrated in FIG. 1, when the intermetallic compound layer is discontinuously present on a surface of a steel sheet, a score is "1", while when the intermetallic compound layer is continuously present or not present in a field of view, a score is "0".

(5) When the total score of the 10 photographs is 7 or more, the intermetallic compound layer is determined to be island-like.

1-3) ZnO Layer on Intermetallic Compound Layer Corresponding to γ-Phase Present in a Phase Equilibrium Diagram of Zn—Ni Alloy A ZnO layer provided in the outermost layer is excellent not only in adhesion to the intermetallic compound layer but also in adhesion to a chemical conversion-treated film formed in pretreatment for coating, thereby significantly increasing coating adhesion. With a thickness of 0.1 μm or more, the adhesion to the conversion-treated film become satisfactory, while with a thickness of 5 μm or less, the coating adhesion is not impaired by cohesive failure of the ZnO layer. Therefore, the thickness of the ZnO layer is preferably 0.1 to 5 μm.

Like the intermetallic compound layer, the ZnO layer can be observed by X-ray diffraction or electron beam diffraction through TEM observation, and the thickness thereof can be measured.

The ZnO layer has excellent adhesion to the intermetallic compound layer provided below the ZnO layer, but the adhesion is further improved by providing, directly below the ZnO layer, at least one compound layer selected from a Si-containing compound layer, a Ti-containing compound layer, an Al-containing compound layer, and a Zr-containing compound layer, resulting in more excellent coating adhesion.

2) Production Method

The hot-pressed member of an exemplary embodiment of the present invention can be produced by heating the Ni-based coated steel sheet including the Zn—Ni alloy coating layer containing 13% by mass or more of Ni on a surface of the steel sheet in a temperature range of an $Ac_3$ transformation point to 1200° C., and then hot-pressing the steel sheet.

As described above, when the Ni-based coated steel sheet is heated in the temperature range of the $Ac_3$ transformation point to 1200° C., Ni in the coating layer diffuses into the steel sheet, forming the Ni-diffusion region. In addition, the intermetallic compound layer described above is formed from the Zn—Ni alloy coating layer provided on the surface and containing 13% by mass or more of Ni, and at the same time, Zn partially diffuses to the surface, forming the ZnO layer in the outermost layer.

Even when the Ni content in the Zn—Ni alloy coating layer is less than 13% by mass, the Ni content is 10% by mass or more, and the coating weight of the Zn—Ni alloy coating layer exceeds 50 g/m$^2$ per side of the steel sheet, so that the hot-pressed member of this embodiment of the present invention can be produced by hot-pressing after heating in the temperature range of the $Ac_3$ transformation point to 1200° C. at an average hating rate of 12° C./second or more.

When the Ni content in the Zn—Ni alloy coating layer is less than 10% by mass or the average heating rate is less than 12° C./second, not only the Ni-diffusion region is not sufficiently formed, but also Zn evaporation becomes excessively active, thereby failing to form the above-described intermetallic compound layer. In addition, when the coating weight of the Zn—Ni alloy coating layer is 50 g/m$^2$ or less per side of the steel sheet, the Ni-diffusion region is not sufficiently formed. Here, the average heating rate of heating in the temperature range of the $Ac_3$ transformation point to 1200° C. is defined as a value obtained by dividing a temperature difference from room temperature to the highest ultimate sheet temperature by a time required from room temperature to the highest ultimate sheet temperature.

Since the surface of the steel sheet is coated with the Zn—Ni coating layer regardless of the Ni content, scales are not produced during heating before hot-pressing.

The average heating rate of heating in the temperature range of the $Ac_3$ transformation point to 1200° C. is preferably 85° C./second or more. Since the time of retention of the steel sheet at a high temperature is shortened by increasing the heating rate, austenite grains in the steel sheet can be made fine during heating, thereby improving the toughness of the member after hot-pressing. In addition, Zn evaporation can be significantly suppressed, and thus corrosion resistance after coating can be improved by forming the above-described intermetallic compound layer. Further, the excessive formation of the ZnO layer can be prevented, and thus coating adhesion can be stably secured. Such a heating rate can be realized by electric heating or high-frequency heating.

The Ni-based coating layer of the Ni-based coated steel sheet may be a Zn—Ni alloy coating single layer or multiple layers including the Zn—Ni alloy coating layer provided on a Ni layer or a Ni-based alloy layer not containing Zn. As the Ni-based alloy, an alloy containing Ni and a total of 20% by mass or less of at least one element selected from Fe, Co, Cr, Mn, Cu, and Mo can be used.

The depth of the Ni-diffusion region and the thickness of the ZnO layer can be adjusted by adjusting the heating conditions (temperature and time), and the abundance of the intermetallic compound layer can be adjusted by the coating weight of the Ni-based coating. The ZnO layer can be spontaneously formed by usual heating in air or heating in an atmosphere at an oxygen concentration of 0.1% by volume or more.

The Ni-based coating layer described above can be formed by an electroplating method or the like.

When at least one compound layer selected from a Si-containing compound layer, a Ti-containing compound layer, an Al-containing compound layer, and a Zr-containing compound layer is further provided on the Zn—Ni alloy coating layer formed on the surface of the steel sheet and is heated in the temperature range of the $Ac_3$ transformation point to 1200° C., Zn partially passes through the compound layer and diffuses to the surface, forming the ZnO layer in the outermost layer. Therefore, at least one compound layer selected from a Si-containing compound layer, a Ti-containing compound layer, an Al-containing compound layer, and a Zr-containing compound layer can be provided immediately below the ZnO. In this case, when the thickness of the compound layer provided on the Zn—Ni alloy layer is 0.1 μm or more, coating adhesion can be sufficiently improved, while when the thickness of the compound layer is 3.0 μm or less, the Si-containing compound layer is not embrittled, and coating adhesion is not degraded. Therefore, the thickness is preferably 0.1 to 3.0 μm and more preferably 0.4 to 2.0 μm.

Examples which can be applied as a Si-containing compound include silicone resins, lithium silicate, silicate soda, colloidal silica, a silane coupling agent, and the like. Examples which can be applied as a Ti-containing compound include titanates such as lithium titanate, calcium titanate, and the like, a titanium coupling agent containing titanium alkoxide or a chelate-type titanium compound as a main component, and the like. Examples which can be applied as an Al-containing compound include aluminates such as sodium aluminate, calcium aluminate, and the like, an aluminum coupling agent containing aluminum alkoxide or a chelate-type aluminum compound as a main component, and the like. Examples which can be applied as a Zr-containing compound include zirconates such as lithium zirconate, calcium zirconate, and the like, a zirconium coupling agent containing zirconium alkoxide or a chelate-type zirconium compound as a main component, and the like.

The compound layer may be formed on the Zn—Ni alloy coating layer by depositing on the Zn—Ni alloy coating layer at least one compound selected from the Si-containing compound, the Ti-containing compound, the Al-containing compound, and the Zr-containing compound and then heat-drying the deposited compound without water washing. This compound may be deposited by any one of a coating method, a dipping method, and a spray method using a roll coater, a squeeze coater, or a die coater. In this case, after coating, dipping, or spraying using a squeeze coater or the like, an air knife method or roll squeeze method may be performed for adjusting the coating amount and achieving uniformity in appearance and uniformity in thickness. In addition, heat-drying is preferably performed so that the highest ultimate temperature of the steel sheet is 40° C. to 200° C., more preferably 50° C. to 160° C.

The compound layer can also be formed on the Zn—Ni alloy coating layer by reactive treatment in which the Ni-based coated steel sheet including the Zn—Ni alloy coating layer is dipped in an acid aqueous solution containing at least one cation selected from Si, Ti, Al, and Zr and at least one anion selected from phosphate ion, hydrofluoric ion, and fluoride ion, and then heat-drying the steel sheet with or without water washing.

In order to produce the hot-pressed member having a strength of 980 MPa or more, it is preferred to use, as a base steel sheet of the Ni-based coated steel sheet, for example, a steel sheet having a composition containing, by % by mass, C: 0.15 to 0.5%, Si: 0.05 to 2.0%, Mn: 0.5 to 3%, P: 0.1% or less, S: 0.05% or less, Al: 0.1% or less, N: 0.01% or less, and the balance including Fe and unavoidable impurities, or a steel sheet further containing, by % by mass, at least one selected from Cr: 0.01 to 1%, Ti: 0.2% or less, and B: 0.0005 to 0.08%, and Sb: 0.003 to 0.03% either alone or in combination.

The reason for limiting each of the component elements is described below. Here, "%" representing the content of each component is "% by mass" unless otherwise specified.

C: 0.15 to 0.5%

C is an element which improves strength of steel, and a C content of 0.15% or more is required for producing a hot-pressed member having a TS of 980 MPa or more. On the other hand, with a C content exceeding 0.5%, blanking workability of the steel sheet used as a material is significantly decreased. Therefore, the C content is 0.15% to 0.5%.

Si: 0.05 to 2.0%

Like C, Si is an element which improves strength of steel, and a Si content of 0.05% or more is required for producing a hot-pressed member having a TS of 980 MPa or more. On the other hand, with a Si content exceeding 2.0%, the occurrence of surface defects referred to as "red scales" is significantly increased during hot rolling, the rolling load is increased, and ductility of the hot-rolled steel sheet deteriorates. Further, with a Si content exceeding 2.0% by mass, when a coating film mainly containing Zn or Al is formed on the surface of the steel sheet by plating, plating processability may be adversely affected. Therefore, the Si content is 0.05 to 2.0%.

Mn: 0.5 to 3%

Mn is an effective element for improving hardenability by suppressing ferrite transformation and is also an effective element for decreasing the heating temperature before hot-pressing because the $Ac_3$ transformation point is decreased. In order to exhibit such an effect, a Mn content of 0.5% or more is required. On the other hand, with a Mn content exceeding 3%, segregation occurs to decrease homogeneity of the characteristics of the steel sheet used as a material and the hot-pressed member. Therefore, the Mn content is 0.5 to 3%.

P: 0.1% or Less

When the P content exceeds 0.1%, segregation occurs to decrease homogeneity of the characteristics of the steel sheet used as a material and the hot-pressed member and also decrease toughness. Therefore, the P content is 0.1% or less.

S: 0.05% or Less

When the S content exceeds 0.05%, toughness of the hot-pressed member is decreased. Therefore, the S content is 0.05% or less.

Al: 0.1% or Less

When the Al content exceeds 0.1%, blanking workability and hardenability of the steel sheet used as a material are decreased. Therefore, the Al content is 0.1% or less.

N: 0.01% or Less

When the N content exceeds 0.01%, nitride AlN is formed during hot rolling and heating before hot-pressing, and blanking workability and hardenability of the steel sheet used as a material are decreased. Therefore, the N content is 0.01% or less.

The balance includes Fe and unavoidable impurities, but preferably, at least one selected from Cr: 0.01 to 1%, Ti: 0.2% or less, and B: 0.0005 to 0.08%, and Sb: 0.003 to 0.03% are either alone or in combination added for the reasons described below.

Cr: 0.01 to 1%

Cr is an effective element for strengthening steel and improving hardenability. In order to exhibit this effect, the Cr content is preferably 0.01% or more. On the other hand, when the Cr content exceeds 1%, the cost is significantly increased. Therefore, the upper limit is preferably 1%.

Ti: 0.2% or Less

Ti is an effective element for strengthening steel and improving toughness by forming fine grains. Also, Ti forms a nitride in priority to B described below and is an effective element for exhibiting the effect of improving hardenability by solid-dissolved B. However, when the Ti content exceeds 0.2%, the rolling load during hot rolling is extremely increased, and toughness of the hot-pressed member is decreased. Therefore, the upper limit is preferably 0.2% or less.

B: 0.0005 to 0.08%

B is an effective element for improving hardenability during hot-pressing and toughness after the hot-pressing. In order to exhibit the effect, the B content is preferably 0.0005% or more. On the other hand, when the B content exceeds 0.08%, the rolling load during hot rolling is extremely increased, and a martensite phase and a bainite phase are produced after hot rolling, thereby causing cracks in the steel sheet. Therefore, the upper limit is preferably 0.08%.

Sb: 0.003 to 0.03%

Sb has the effect of suppressing the occurrence of a decarburized layer in the surface layer of the steel sheet during the time from heating of the steel sheet before hot-pressing to cooling of the steel sheet by a series of hot-pressing treatments. In order to exhibit the effect, a Sb content of 0.003% or more is required. On the other hand, when the Sb content exceeds 0.03%, the rolling load is increased, thereby decreasing productivity. Therefore, the Sb content is 0.003 to 0.03%.

Examples of the heating method before hot-pressing include, but are not limited to, heating with an electric furnace or gas furnace, flame heating, electric heating, high-frequency heating, inductive heating, and the like.

EXAMPLES

Figure 2:
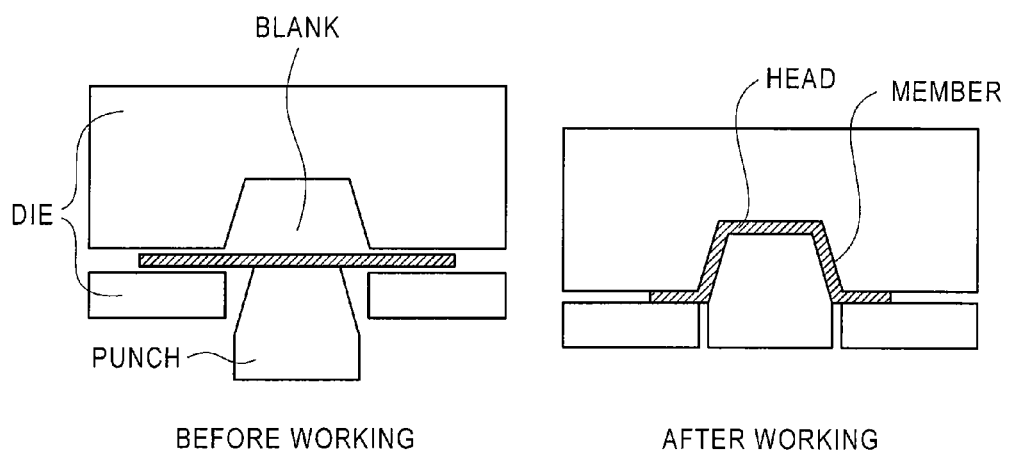
FIG. 2 is a drawing schematically showing a pressing method used in an example of the invention.

Both surfaces of a cold-rolled steel sheet having an $Ac_3$ transformation point of 818° C., a thickness of 1.6 mm, and a composition containing, by % by mass, C: 0.23%, Si: 0.12%, Mn: 1.5%, P: 0.01%, S: 0.01%, Al: 0.03%, N: 0.005%, Cr: 0.4%, B: 0.0022%, and the balance including Fe and unavoidable impurities were electroplated in a plating bath containing 50 g/L (litter) of sodium sulfate, 100 g/L of nickel sulfate hexahydrate, and 50 g/L of zinc sulfate heptahydrate at pH2 and a temperature of 50° C. with a current density changed from 10 to 50 $A/dm^2$ to form Zn—Ni alloy coating layers having different Ni contents and coating weights shown in Tables 1 and 2. Then, any one of a Si-containing compound, a Ti-containing compound, an Al-containing compound, and Zr-containing compound shown in Tables 1 and 2 was applied to each of the steel sheets with some exception and then dried under a condition in which the ultimate temperature was 140° C. to form any one of a Si-containing compound layer, a Ti-containing compound layer, an Al-containing compound layer, and Zr-containing compound layer having a thickness of 0.5 μm. Then, a blank of 200 mm×220 mm collected from each of the resultant steel sheets as a material was heated at an average heating rate of 8° C./sec in an air atmosphere in an electric furnace for 10 minutes at each of the heating temperatures shown in Tables 1 and 2. Then, each of the blanks was taken out from the furnace and immediately drawn by a pressing method schematically shown in FIG. 2 to form hot-pressed member Nos. 1, 4, 7 to 21, 28 to 30, 34, 37, 40, and 41. In addition, some of the steel sheets were heated by direct electric heating at an average heating rate of 12° C./sec or 90° C./sec, taken out from the furnace after each of the heating temperatures shown in Tables 1 and 2 was attained, and immediately drawn by the same pressing method as described above to form hot-pressed member Nos. 2, 3, 5, 6, 22 to 27, 31 to 33, 35, 36, 38, and 39. In drawing, the punch width was 70 mm, and the processing height was 30 mm. In addition, a sample was collected from a flat portion of the top of each member, and the depth of the Ni-diffusion region, the thickness of the ZnO layer, and the spontaneous immersion potential, which was an index for the abundance of the intermetallic compound layer, were measured by the above-described method. At the same time, the state of the intermetallic compound layer was confirmed by SEM observation of the section described above. In addition, scale resistance, coating adhesion, corrosion resistance after coating, and hydrogen entry resistance were examined by the methods described below.

Figure 3:
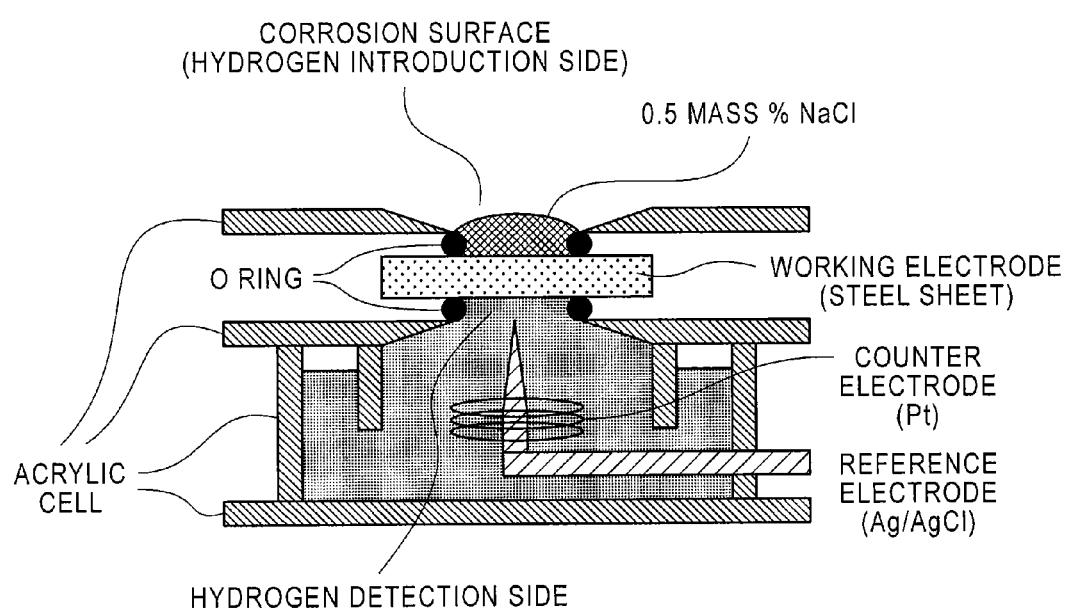
FIG. 3 is a drawing schematically showing an electrochemical cell used in an example of the invention.

Scale resistance: evaluated by visually observing a punch non-contact surface after hot-pressing on the basis of the following criteria:
Circle: Adhesion of no scale
Cross: Adhesion of scales Coating adhesion: A sample was collected from a flat portion of the top of the member, and a punch non-contact surface was chemical conversion-treated using PB-SX35 manufactured by Nihon Parkerizing Co., Ltd. under standard conditions, and then electro-deposition paint GT-10HT gray manufactured by Kansai Paint Co., Ltd. was deposited to a thickness of 20 μm under the baking conditions of 170° C. and 20 minutes to form a coated test piece. The conversion-treated and electro-deposited surface of the thus-formed test piece was cross-cut to the steel base material in a grid-like pattern (10×10 squares, 1 mm spacing) with a cutter knife, and subjected to a cross-cut tape peel test in which an adhesive tape was applied and peeled. Evaluation was performed on the basis of the following criteria, and circle and triangle marks were regarded as satisfying an object of the present invention.
Circle: No peeling
Triangle: Peeling occurred in 1 to 10 squares
Cross: Peeling occurred in 11 or more squares Corrosion resistance after coating: The conversion-treated and electro-deposited surface of a test piece prepared by the same method as described above for the coating adhesion was cross-cut with a cutter knife, and then subjected to a corrosion test under corrosion test cycle conditions according to SAE-J2334. The maximum coating blistering width on one side after 25 cycles was measured and evaluated on the basis of the following criteria, and circle and triangle marks were regarded as satisfying an object of the present invention.
Circle: 0 nm≤blistering width<1.5 mm
Triangle: 1.5 nm≤blistering width<3.0 mm
Cross: 3.0 nm≤blistering width Resistance to hydrogen entry: A sample was collected from a flat portion of the top of the member, and one surface (punch non-contact surface) was mirror-ground to a thickness of 1 mm. Next, the ground surface of the sample was Ni-coated and used as a hydrogen detection surface, and the sample serving as a working electrode and platinum serving as a counter electrode were set in an electrochemical cell schematically shown in FIG. 3 to measure the amount of hydrogen entry into steel by an electrochemical hydrogen permeation method under corrosion of the unground surface at room temperature in air. That is, the hydrogen detection surface side was filled with a 0.1 M aqueous NaOH solution, and a reference electrode (Ag/AgCl) was set through a salt bridge. In addition, a 0.5 M NaCl solution was dropped on the unground surface (evaluation surface: punch non-contact surface), followed by corrosion at room temperature in air. The potential on the hydrogen detection surface side was set to 0 V vs Ag/AgCl, and the hydrogen permeation current value was continuously measured for 5 days by dropping pure water to the corrosion portion one time per day. The resistance to hydrogen entry with corrosion was evaluated from the maximum current value on the basis of the criteria below. Double circle and circle marks were regarded as satisfying an object of the present invention. In addition, the member on which scales significantly occurred during hot-pressing was tested after the scales were removed from the surfaces by shot blasting.
Double circle: The maximum current was 1/10 or less of the cold-rolled steel sheet.
Circle: The maximum current was over 1/10 to 1/2 or less of the cold-rolled steel sheet.
Cross: The maximum current was over 1/2 of to the same as the cold-rolled steel sheet.

The results are shown in Tables 3 and 4. It is found that hot-pressed member Nos. 1 to 27 and 30 according to aspects of the present invention are excellent not only in scale resistance, coating adhesion, and corrosion resistance after coating but also in resistance to hydrogen entry.

TABLE 1

| | Surface layer structure of steel sheet material | | | | Heating conditions before hot pressing | |
|---|---|---|---|---|---|---|
| | Zn—Ni alloy coating layer | | Si/Ti/Al/Zr-containing compound layer | | Heating | Heating |
| Hot-pressed member No. | Ni content (mass %) | Coating weight (g/m2) | Type | Thickness (μm) | temperature (° C.) | rate (° C./sec) |
| 1 | 13 | 30 | No | | 900 | 8 |
| 2 | 15 | 40 | No | | 900 | 12 |
| 3 | 14 | 50 | No | | 900 | 90 |
| 4 | 15 | 30 | Silicone resin | 0.5 | 950 | 8 |
| 5 | 13 | 50 | Silicone resin | 0.5 | 950 | 12 |
| 6 | 14 | 4 | Silicone resin | 0.5 | 950 | 90 |
| 7 | 15 | 30 | Lithium silicate | 0.5 | 950 | 8 |
| 8 | 15 | 30 | Colloidal silica | 0.5 | 950 | 8 |
| 9 | 15 | 30 | Silane coupling agent | 0.5 | 950 | 8 |
| 10 | 16 | 30 | Silicone resin | 0.5 | 950 | 8 |
| 11 | 18 | 30 | Silicone resin | 0.5 | 1000 | 8 |
| 12 | 13 | 30 | No | | 950 | 8 |
| 13 | 13 | 40 | Silicone resin | 0.5 | 1100 | 8 |
| 14 | 13 | 50 | Silicone resin | 0.5 | 850 | 8 |
| 15 | 13 | 20 | Silicone resin | 0.5 | 900 | 8 |
| 16 | 13 | 30 | Lithium titanate | 0.5 | 950 | 8 |
| 17 | 13 | 30 | Titanium coupling agent | 0.5 | 950 | 8 |
| 18 | 13 | 30 | Sodium aluminate | 0.5 | 950 | 8 |
| 19 | 13 | 30 | Aluminum coupling agent | 0.5 | 950 | 8 |
| 20 | 13 | 30 | Lithium zirconate | 0.5 | 950 | 8 |
| 21 | 13 | 30 | Zirconium coupling agent | 0.5 | 950 | 8 |

| | Surface layer structure of hot-pressed member | | | | | |
|---|---|---|---|---|---|---|
| Hot-pressed member No. | Depth if Ni-diffusion region (μm) | State of intermetallic compound layer | Presence of Si/Ti/Al/Zr-containing compound layer | Thickness of ZnO layer (μm) | Spontaneous immersion potential (mV) | Remark |
| 1 | 5 | Island | No | 2 | −550 | Invention Example |
| 2 | 3 | Island | No | 2 | −550 | Invention Example |
| 3 | 1 | Island | No | 2 | −550 | Invention Example |
| 4 | 20 | Island | Yes | 2 | −500 | Invention Example |
| 5 | 5 | Island | Yes | 2 | −500 | Invention Example |
| 6 | 2 | Island | Yes | 2 | −500 | Invention Example |
| 7 | 20 | Island | Yes | 2 | −500 | Invention Example |
| 8 | 20 | Island | Yes | 2 | −500 | Invention Example |
| 9 | 20 | Island | Yes | 2 | −500 | Invention Example |
| 10 | 25 | Island | Yes | 3 | −450 | Invention Example |
| 11 | 30 | Island | Yes | 5 | −400 | Invention Example |
| 12 | 10 | Island | Yes | 3 | −450 | Invention Example |
| 13 | 30 | Island | Yes | 2 | −450 | Invention Example |
| 14 | 20 | Island | Yes | 2 | −450 | Invention Example |
| 15 | 20 | Island | Yes | 2 | −450 | Invention Example |
| 16 | 20 | Island | Yes | 2 | −500 | Invention Example |
| 17 | 20 | Island | Yes | 2 | −500 | Invention Example |
| 18 | 20 | Island | Yes | 2 | −500 | Invention Example |
| 19 | 20 | Island | Yes | 2 | −500 | Invention Example |
| 20 | 20 | Island | Yes | 2 | −500 | Invention Example |
| 21 | 20 | Island | Yes | 2 | −500 | Invention Example |

TABLE 2

| | Surface layer structure of steel sheet used as a material | | | | Heating conditions before hot pressing | |
|---|---|---|---|---|---|---|
| | Zn—Ni alloy coating layer | | Si/Ti/Al/Zr-containing compound layer | | Heating | Heating |
| Hot-pressed member No. | Ni content (mass %) | Coating weight (g/m²) | Type | Thickness (μm) | temperature (° C.) | rate (° C./sec) |
| 22 | 10 | 60 | No | | 950 | 12 |
| 23 | 12 | 60 | No | | 950 | 12 |
| 24 | 12 | 60 | Silicone resin | 0.5 | 950 | 12 |
| 25 | 10 | 60 | No | | 960 | 90 |
| 26 | 12 | 60 | NO | | 950 | 90 |

TABLE 2-continued

| | | | | | | | |
|---|---|---|---|---|---|---|---|
| 27 | 12 | 60 | Silicone resin | | 0.5 | 950 | 90 |
| 28 | 10 | 60 | | No | | 950 | 8 |
| 29 | 12 | 60 | | NO | | 950 | 8 |
| 30 | 12 | 60 | Silicone resin | | 0.5 | 950 | 12 |
| 31 | 10 | 30 | | No | | 950 | 12 |
| 32 | 12 | 30 | | No | | 950 | 12 |
| 33 | 12 | 30 | Silicone resin | | 0.5 | 950 | 12 |
| 34 | 9 | 60 | | No | | 950 | 8 |
| 35 | 9 | 60 | | No | | 950 | 12 |
| 36 | 9 | 60 | | No | | 950 | 90 |
| 37 | 9 | 60 | Silicone resin | | 0.5 | 950 | 8 |
| 38 | 9 | 60 | Silicone resin | | 0.5 | 950 | 12 |
| 39 | 9 | 60 | Silicone resin | | 0.5 | 950 | 90 |
| 40 | | | Galvanized steel sheet | | | 950 | 8 |
| 41 | | | Cold-rolled steel sheet | | | 950 | 8 |

| Hot-pressed member No. | Depth of Ni-diffusion region (μm) | State of intermetallic compound layer | Presence of Si/Ti/Al/Zr-containing compound layer | Thickness of ZnO layer (μm) | Spontaneous immersion potential (mV) | Remark |
|---|---|---|---|---|---|---|
| 22 | 3 | Island | No | 3 | −400 | Invention Example |
| 23 | 3 | Island | No | 3 | −380 | Invention Example |
| 24 | 5 | Island | Yes | 2 | −500 | Invention Example |
| 25 | 1 | Island | No | 3 | −400 | Invention Example |
| 26 | 1 | Island | No | 3 | −380 | Invention Example |
| 27 | 2 | Island | Yes | 2 | −500 | Invention Example |
| 28 | 5 | No | No | 5 | −350 | Comparative Example |
| 29 | 5 | No | No | 3 | −350 | Comparative Example |
| 30 | 10 | Island | Yes | 2 | −500 | Invention Example |
| 31 | 3 | Island | No | 3 | −400 | Comparative Example |
| 32 | 3 | Island | No | 3 | −380 | Comparative Example |
| 33 | 5 | Island | Yes | 2 | −500 | Comparative Example |
| 34 | 2 | No | No | 5 | −350 | Comparative Example |
| 35 | 1 | Island | No | 3 | −350 | Comparative Example |
| 36 | 1 | Island | No | 3 | −350 | Comparative Example |
| 37 | 2 | No | Yes | 3 | −350 | Comparative Example |
| 38 | 1 | Island | Yes | 3 | −350 | Comparative Example |
| 39 | 1 | Island | Yes | 3 | −350 | Comparative Example |
| 40 | 0 | No | No | 5 | −700 | Comparative Example |
| 41 | 0 | No | No | 0 | −300 | Comparative Example |

TABLE 3

| Hot-pressed member No. | Scale resistance | Coating adhesion | Corrosion resistance after coating | Hydrogen entry resistance | Remarks |
|---|---|---|---|---|---|
| 1 | ○ | Δ | ○ | ○ | Invention Example |
| 2 | ○ | Δ | ○ | ○ | Invention Example |
| 3 | ○ | Δ | ○ | ○ | Invention Example |
| 4 | ○ | ○ | ○ | ○ | Invention Example |
| 5 | ○ | ○ | ○ | ○ | Invention Example |
| 6 | ○ | ○ | ○ | ○ | Invention Example |
| 7 | ○ | ○ | ○ | ○ | Invention Example |
| 8 | ○ | ○ | ○ | ○ | Invention Example |
| 9 | ○ | ○ | ○ | ○ | Invention Example |
| 10 | ○ | ○ | ○ | ○ | Invention Example |
| 11 | ○ | ○ | ○ | ○ | Invention Example |
| 12 | ○ | Δ | ○ | ○ | Invention Example |
| 13 | ○ | ○ | ○ | ○ | Invention Example |
| 14 | ○ | ○ | ○ | ○ | Invention Example |
| 15 | ○ | ○ | ○ | ○ | Invention Example |
| 16 | ○ | ○ | ○ | ○ | Invention Example |
| 17 | ○ | ○ | ○ | ○ | Invention Example |
| 18 | ○ | ○ | ○ | ○ | Invention Example |
| 19 | ○ | ○ | ○ | ○ | Invention Example |
| 20 | ○ | ○ | ○ | ○ | Invention Example |
| 21 | ○ | ○ | ○ | ○ | Invention Example |

TABLE 4

| Hot-pressed member No. | Scale resistance | Coating adhesion | Corrosion resistance after coating | Hydrogen entry resistance | Remarks |
|---|---|---|---|---|---|
| 22 | ○ | Δ | Δ | ○ | Invention Example |
| 23 | ○ | Δ | Δ | ○ | Invention Example |
| 24 | ○ | ○ | Δ | ○ | Invention Example |
| 25 | ○ | Δ | Δ | ○ | Invention Example |
| 26 | ○ | Δ | Δ | ○ | Invention Example |
| 27 | ○ | ○ | Δ | ○ | Invention Example |
| 28 | ○ | X | X | ○ | Comparative Example |
| 29 | ○ | X | X | ○ | Comparative Example |

TABLE 4-continued

| Hot-pressed member No. | Scale resistance | Coating adhesion | Corrosion resistance after coating | Hydrogen entry resistance | Remarks |
|---|---|---|---|---|---|
| 30 | ○ | ○ | Δ | ○ | Invention Example |
| 31 | ○ | Δ | Δ | x | Comparative Example |
| 32 | ○ | Δ | Δ | x | Comparative Example |
| 33 | ○ | ○ | Δ | x | Comparative Example |
| 34 | ○ | x | x | x | Comparative Example |
| 35 | ○ | x | x | x | Comparative Example |
| 36 | ○ | x | x | x | Comparative Example |
| 37 | ○ | x | x | x | Comparative Example |
| 38 | ○ | x | x | x | Comparative Example |
| 39 | ○ | x | x | x | Comparative Example |
| 40 | ○ | x | Δ | x | Comparative Example |
| 41 | x | x | x | x | Comparative Example |

The invention claimed is:

1. A hot-pressed member that is produced by heating and then hot-pressing a Ni-based coated steel sheet,
wherein the Ni-based coated steel sheet includes, on a surface thereof, (i) a Zn—Ni alloy coating layer containing 13% by mass or more of Ni, or (ii) a Zn—Ni alloy coating layer containing 10% by mass or more and less than 13% by mass of Ni at a coating weight of over 50 g/m² per side of the steel sheet,
wherein the hot-pressed member that is produced by heating and then hot-pressing the Ni-based coated steel sheet comprises a Ni-diffusion region that is present in a surface layer of the steel sheet, and an intermetallic compound layer and a ZnO layer which are provided such that the intermetallic compound layer is provided on the Ni-diffusion layer and the ZnO layer is provided on the intermetallic compound layer, the intermetallic compound layer comprising a γ phase present in a phase equilibrium diagram of a Zn—Ni alloy, and wherein a spontaneous immersion potential indicated in a 0.5 M NaCl aqueous air-saturated solution at 25° C.±5° C. is −600 to −360 mV based on a standard hydrogen electrode.

2. The hot-pressed member according to claim 1, wherein the Ni-diffusion region is present over a range of 1 μm or more in the depth direction of the steel sheet.

3. The hot-pressed member according to claim 1, wherein the intermetallic compound layer is present in an island form.

4. The hot-pressed member according to claim 1, wherein at least one compound layer selected from a Si-containing compound layer, a Ti-containing compound layer, an Al-containing compound layer, and a Zr-containing compound layer is provided directly below the ZnO layer.

5. A hot-pressed member comprising a steel sheet, a Ni-diffusion region which is present in a surface layer of the steel sheet, and an intermetallic compound layer and a ZnO layer which are provided such that the intermetallic compound layer is provided on the Ni-diffusion layer and the ZnO layer is provided on the intermetallic compound layer, the intermetallic compound layer comprising a γ phase present in a phase equilibrium diagram of a Zn—Ni alloy, wherein a spontaneous immersion potential indicated in a 0.5 M NaCl aqueous air-saturated solution at 25° C. ±5° C. is −600 to −360 mV based on a standard hydrogen electrode, and wherein at least one compound layer selected from a Si-containing compound layer, a Ti-containing compound layer, an Al-containing compound layer, and a Zr-containing compound layer is provided directly below the ZnO layer.

6. The hot-pressed member according to claim 5, wherein the Ni-diffusion region is present over a range of 1 μm or more in the depth direction of the steel sheet.

7. The hot-pressed member according to claim 5, wherein the intermetallic compound layer is present in an island form.

* * * * *